United States Patent [19]

Deguchi et al.

[11] Patent Number: 4,672,506
[45] Date of Patent: Jun. 9, 1987

[54] CAPACITOR

[75] Inventors: Yukichi Deguchi; Hiroaki Kobayashi, both of Otsu, Japan

[73] Assignee: Toray Industries, Inc., Shiga, Japan

[21] Appl. No.: 834,280

[22] PCT Filed: Jun. 4, 1985

[86] PCT No.: PCT/JP85/00309

§ 371 Date: Feb. 4, 1986

§ 102(e) Date: Feb. 4, 1986

[30] Foreign Application Priority Data

Jun. 4, 1984 [JP] Japan ................. 59-113164

[51] Int. Cl.$^4$ ............................................. H01G 4/08
[52] U.S. Cl. ................................................. 361/323
[58] Field of Search ........................... 361/311–315, 361/323, 433 W, 306–310, 321 C, 433 C, 433 S, 404

[56] References Cited

U.S. PATENT DOCUMENTS

| | | | |
|---|---|---|---|
| 2,819,492 | 1/1958 | Cummin et al. | 361/315 |
| 3,430,116 | 2/1969 | Johnstone | 361/314 |
| 3,585,468 | 6/1971 | Chertok et al. | 361/323 |
| 4,130,722 | 12/1978 | Levijoki | 361/321 X |
| 4,367,511 | 1/1983 | Crass et al. | 361/323 X |
| 4,458,294 | 7/1984 | Womack | 361/321 X |
| 4,527,219 | 7/1985 | Johnson et al. | 361/323 |
| 4,578,737 | 3/1986 | Westermann | 361/308 |

FOREIGN PATENT DOCUMENTS 806266  6/1951  Fed. Rep. of Germany ...... 361/309

*Primary Examiner*—Donald A. Griffin
*Attorney, Agent, or Firm*—Armstrong, Nikaido, Marmelstein & Kubovcik

[57] ABSTRACT

A capacitor in which the dielectric material comprises a biaxially oriented polyphenylene sulfide film and the electrodes are thin layers or foils of a metal is provided.

The biaxially oriented polyphenylene sulfide film comprises a resin composition mainly consisting of poly-p-phenylene sulfide and having a small-protrusion density, Sd, on the surface in the range of from 20 to 300/mm and a large-protrusion density, Ld, in the range of 5/mm or below.

7 Claims, 4 Drawing Figures

CAPACITOR

DESCRIPTION

Technical Field

This invention relates to a capacitor, and more particularly, a capacitor in which the dielectric material comprises a plastic film.

Heretofore, it is known for example in Japanese patent application Kokai publication No. 57-187327 that a capacitor excellent in frequency characteristics, temperature characteristics and soldering resistance can be obtained by using a biaxially oriented polyphenylene sulfide film as the dielectric material of the capacitor.

A capacitor in which the dielectric material comprises a heat-resistant film such as a polyimide film or an aromatic polyamide film is also known.

Because of its excellent electrical characteristics, such a capacitor in which the dielectric material comprises a plastic film, the so-called film capacitor, is frequently used in circuits which require precision, such as a time constant circuit.

However, such a conventional capacitor, especially one having a thin dielectric material has a defect that its capacitance and breakdown voltage disperse widely.

Further, in recent years, in order to reduce the size of a circuit and to improve an efficiency of packaging, it is necessary to fabricate a film capacitor in chip form.

However, on mounting a capacitor in chip form (hereinafter, referred to as a chip capacitor), it must be directly fixed on a circuit substrate by, for example, dipping it in a soldering bath and so the whole capacitor is exposed to a high temperature. Thus it is impossible to fabricate an ordinary capacitor in which the dielectric material comprises polyester, polypropylene, polycarbonate, polystyrene or the like in chip form because, even when it is equipped with a thick outer package, it is lacking in heat resistance and it undergoes a marked change in capacitance, loss of insulation resistance, poor connection, etc. during packaging.

On the other hand, when a polyimide film, an aromatic polyamide film or the like is used as a dielectric material, it is possible in respect of soldering-heat resistance to fabricate the capacitor in chip form, but such a capacitor shows poor electrical characteristics and has limited usefulness as a film capacitor.

Accordingly, the use of a biaxially oriented polyphenylene sulfide film as a dielectric material was proposed to realize both desirable electrical characteristics and soldering resistance. However, such a capacitor is not satisfactory in respect of soldering resistance in fabricating in chip form unless the periphery of its element is covered with a thick outer package and, if this is done, its outer size increases, which is contradictory to the aim of reducing the size of a circuit by fabricating the capacitor in chip form.

It is an object of this invention to provide a capacitor which has small dispersions of capacitance and breakdown voltage, satisfies both of electrical characteristics and soldering resistance on higher levels and shows remarkably excellent characteristics as a chip capacitor by eliminating the above-mentioned defects of a conventional capacitor.

DISCLOSURE OF THE INVENTION

Therefore, this invention provides a capacitor in which the dielectric material comprises a biaxially oriented polyphenylene sulfide film comprising a resin composition mainly consisting of poly-p-phenylene sulfide and having a small-protrusion density on the surface in the range of from 20 to 300/mm and a large-protrusion density on the surface in the range of 5/mm or below, and the electrodes comprise thin layers or foils of a metal.

As a result, the capacitor of this invention has excellent characteristics, which have not been realized in any conventional film capacitor, that it is excellent in the stability and uniformity of capacitance and breakdown voltage and that it can be mounted as a chip capacitor on a substrate by a surface mounting process without any limitation by using a usual soldering apparatus under usual conditions with only little changes in capacitance, suppressed lowering in insulation resistance and withstand voltage, etc.

BEST MODE FOR CARRYING OUT THE INVENTION

Figure 1:
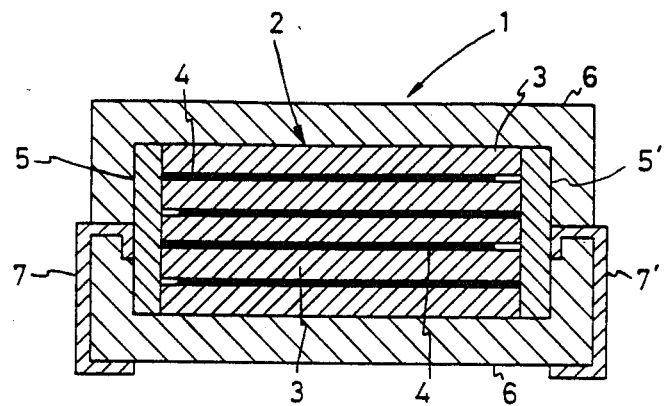
FIG. 1 is a sectional view of a first embodiment of the capacitor of this invention.

By the poly-p-phenylene sulfide as used in this invention is meant a polymer comprising at least 70 mol % (preferably at least 85 mol %), based on the total repeating units, of structural units each represented by the general formula:

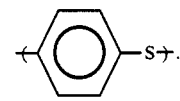

When the content of this component is below 70 mol %, the crystallinity, heat transition temperature, etc., are decreased and the merits such as heat resistance, dimensional stability, mechanical properties, etc., of a film comprising a resin composition mainly consisting of poly-p-phenylene sulfide or of its laminate are injured.

It is possible that said polymer contains copolymerizable units having a sulfide bond so long as the content is below 30 mol % (preferably 15 mol %) based on the total repeating units.

By the resin composition mainly consisting of poly-p-phenylene sulfide (hereinafter, abbreviated as PPS) as used in this invention is meant a composition containing at least 90 wt. % of said poly-p-phenylene sulfide.

When the poly-p-phenylene sulfide content is below 90 wt. %, the crystallinity, heat transition temperature, etc., of the composition are decreased and the merits, such as heat resistance, dimensional stability, mechanical properties, etc., of a film comprising this composition or of a laminate thereof are injured.

It is possible that the remainder of below 10 wt. % of said composition is composed of a polymer other than the poly-p-phenylene sulfide, an inorganic or organic filler, etc. It is also possible that said composition contains additives such as an inorganic or organic lubricant, a colorant, and an ultraviolet absorber.

It is preferable in respect of the ease of film forming that the melt viscosity of said resin composition is in the range of from 500 to 12000 poise (preferably from 700 to 7000 poise) when measured under conditions of a temperature of 300° C. and a shear rate of 200 sec$^{-1}$.

By the biaxially oriented polyphenylene sulfide film (hereinafter abbreviated as PPS-BO) as mentioned in this invention is meant a film prepared by melt-molding said PPS into a sheet and biaxially stretching and heat-treating the sheet.

It is preferable that the degree of orientation of said film is such that the orientation factor (OF) as determined from a crystalline peak of $2\theta = 20 \sim 21°$ in wide-angle X-ray diffraction is from 0.1 to 0.6 for each of ones in the end and edge directions and from 0.6 to 1.0 for one in the through direction.

Preferably, the film thickness is in the range of 0.3 to 5 μm.

By the small-protrusion density Sd as used in this invention is meant a linear density (the number of protrusions per unit length) of protrusions having a height of 0.02 μm or above.

The protrusion height is one determined with a stylus profilometer (with a cut-off value of 0.08 mm and a stylus radius of 2 μm) and has a value at the i-th protrusion Pi determined as follows:

$$Pi = (Mi - Vi)/N$$

wherein Mi is the level of the top of the i-th mountain on a chart of a roughness curve as measured on a film over a length of 1 mm at a vertical magnification N, and Vi is the level of the valley on the left side of the i-th mountain.

It is necessary that the Sd of the PPS-BO used in this invention lies in the range of from 20 to 300 (preferably from 30 to 200)/mm. When the Sd is too large or too small, the object of this invention can not be achieved.

By the large-protrusion density as used in this invention is meant a linear density of protrusions having a height of at least 0.2 μm.

It is necessary that the Ld of the PPS-BO used in this invention lies in the range of 5 or below (preferably 3 or below)/mm. When the Ld is too large, the object of this invention can not be achieved.

Although a value of Sd or Ld in this invention is not unconditionally equivalent to a value of an average surface roughness Ra as measured by the method as stipulated in JIS R-0601, it is preferable that the Ra of the PPS-BO used in this invention lies in the range of from 0.02 to 0.30 μm (preferably from 0.02 to 0.08 μm).

Conversely, when the Ra of a PPS-BO lies in this range but its Sd and Ld do not meet the above requirements, it is a matter of course that the object of this invention can not be achieved.

It is preferable in respect of the soldering resistance of the obtained capacitor that the density of the PPS-BO used in this invention is 1.356 g/cm$^3$ or above.

It is preferable that the heat shrinkage at 250° C. for 10 min of the PPS-BO used in this invention is from 0 to 8% (preferably from 0 to 6%) for one in the machine direction of a film and from −2 to 6% (preferably from −1 to 3%) for one in the transverse direction of the film.

It is preferable that the moisture absorption of the PPS-BO used in this invention is 0.1% or below at 100% RH.

It is preferable in respect of the characteristics of a capacitor that the breakdown voltage of the PPS-BO used in this invention is 240 kV/mm or above for DC.

By the capacitor as mentioned in this invention is meant a device which is a kind of a passive element of an electric circuit and which, by having a pair of electrodes made of a conductor across a dielectric material, can be given a definite electrostatic capacitance between the electrodes.

The electrodes of the capacitor of this invention comprises thin layer or foils of a metal, and their shapes, materials, etc., are not particularly limited.

The metal foil is a self-supporting film and its thickness is preferably from 3 to 15 μm.

The thin metal layer is a non-self-supporting metal film formed on the surface of a PPS-BO as a support by a process such as vacuum deposition or plating, and its thickness is preferably from 0.01 to 0.5 μm.

Although materials for these metal films are not particularly limited, aluminum, zinc, tin, nickel, chromium, iron, copper, titanium, and alloys thereof are preferable, and nickel, chromium, titanium, zinc, and alloys thereof which have moisture resistance are particularly preferable.

The film resistance value of this electrode is preferably in the range of from 0.5 to 50 Ω.

When a thin metal layer is used as an electrode of the capacitor of this invention, it is preferable in respect of capacitance changes, the stability of insulation resistance, rate of occurrence of poor insulation, etc., occurring during soldering the capacitor as a chip capacitor that the so-called metallized film, which is an integrated body obtained by forming a thin metal film on a PPS-BO support, has a heat shrinkage at 250° C. for 10 min of from 0 to +8%, preferably from 0 to +6%, particularly preferably from +1 to +4%, for one in the machine direction of a film and from −2 to +6%, preferably from −1 to +3%, particularly preferably from −1 to +1%, for one in the transverse direction of a film.

Although the capacitor of this invention is featured in that it has the above-mentioned PPS-BO as the dielectric material, it is also possible without any disadvantage that, in addition to the PPS-BO, a dielectric thin film other than the PPS-BO is placed between the electrodes, so long as it is not detrimental to the inherent merits, i.e., temperature characteristics, frequency characteristics, soldering-heat resistance, etc., of a capacitor in which the dielectric material comprises PPS-BO.

Although examples of these dielectric layers include polysulfone, polyphenylene oxide, polycarbonate polyether sulfone, polyether-imide, and fluorocarbon resins, they are by no means limited thereto.

In a first embodiment of the capacitor of this invention, the capacitor has an electrode lead members infusible at 260° C. as an electrode lead part for connecting said electrode to an external circuit on each of the end surfaces of the capacitor element.

The capacitor element herein mentioned is one formed by winding or stacking a metallized film or films obtained by forming electrodes on the surface of a film in the above-mentioned manner.

Preferred electrode lead members are thin metal pieces having a thickness of from 0.05 to 0.5 mm. In a more preferable embodiment, Metallikon spraying is applied to each of the end surfaces of the capacitor element. In this case, one end of said thin metal pieces is electrically connected to said Metallikon, another end is outside the outer package, and each of said metal pieces can cover a part of the end surface and a part of the bottom surface of the package.

Further, in this first embodiment, the capacitor has an outer package comprising a thermosetting resin having a heat distortion temperature of 230° C. or above.

This heat distortion temperature is one as stipulated in ASTM D648-72 and was measured under a stress of 1820 kPa.

When this heat distortion temperature is below 230° C., the capacitor undesirably undergoes large changes in capacitance or loss of insulation resistance during soldering.

Although as high a heat distortion temperature as possible is preferred and there is no upper limit thereto, a heat distortion temperature of 350° C. or above is practically impossible.

With respect to the thickness of said outer package, it is preferable that it is 0.3 mm or above at the thinnest part and 5 mm or below at the thickness part.

It is preferable that the water absorption as stipulated in ASTM D-570 (in water of 23° C. for 24 hr) of the resin composition for forming said outer package is 0.1% or below.

A preferable resin composition is an epoxy resin.

A preferred process for molding said outer package is a transfer molding process.

In a second embodiment of the capacitor of this invention, it has an electrode lead member infusible at 260° C. as an electrode lead part for connecting the above-mentioned electrode to an external circuit on each of the end surfaces of the capacitor element.

Examples of said electrode lead member are a high-melting Metallikon having a melting point exceeding 260° C., a thermosetting electroconductive paste, and a metal cap mechanically fixed on the body of the element which is sprayed with a usual Metallikon. Each of said electrode lead members in this second embodiment covers the whole of each end surface and part of the lower surface.

The above-described structure contributes to ensure electric connection of the capacitor to a circuit substrate in soldering it as a chip capacitor to the substrate. Therefore, a time necessary for soldering can be shortened and the capacitor can be prevented from undergoing changes in capacitance, lowering in insulation resistance and withstand voltage, etc., during soldering.

The capacitor in the second embodiment of this invention has substantially no outer package.

A capacitor having no outer package means one which can be used as the part of an electric circuit without providing the periphery of its capacitor element with an outer coating layer with a thickness of about 0.2 mm or above (hereinafter referred to simply as outer package) which can protect the capacitor element from heat and external mechanical force.

Therefore, it is a matter of course that even when a capacitor element is treated to such an extent that a film without a vacuum-deposited electrode is wound around a core or an external periphery (in the case of a laminate capacitor, the core and external in simultaneous integrated winding), the cut edge of a stacked capacitor is coated with a lacquer for keeping the insulation characteristics of this cut edge, or an adhesive is applied thereto for keeping the binding of an element (with the thickness of about 0.5 mm or below, preferably about 0.2 mm or below, through not particularly limited).

The capacitor of this invention is the most useful when it is used as a chip capacitor, that is, when it is mounted by directly soldering its electrode lead members to a conductor of a circuit without providing any lead wire otherwise connected to the electrode lead members and without providing holes for inserting the lead wires in the circuit substrate (hereinafter, such a packaging method is sometimes referred to as a surface mounting method).

By the end surface of a capacitor as used in this invention is meant a surface normal to the axis of winding in winding a metallized film (in the case of a stacked capacitor, the axis of winding in performing simultaneous integrated winding).

The process for producing the capacitor of this invention will now be described.

First, a process for producing poly-p-phenylene sulfide comprises reacting an alkali sulfide with a p-dihalobenzene in a polar solvent at high temperature and high pressure. It is particularly preferable that sodium sulfide is reacted with a p-dichlorobenzene in an amide type high-boiling polar solvent such as N-methylpyrrolidone. In this case, in order to control the degree of polymerization, it is the most desirable that the reaction is carried out at 230° to 280° C. in the presence of the so-called polymerization aid such as a caustic alkali or an alkali metal salt of a carboxylic acid. The pressure in the polymerization system and the polymerization time is suitably determined depending upon the kind and amount of an aid used and the desired degree of polymerization or the like.

If desired, other polymers, additives, etc. are added to or blended with the thus-obtained poly-p-phenylene sulfide.

At this time, in order to control the surface roughness of the film, it is preferable that from 0 to 5 wt. % (preferably from 0.3 to 3 wt. %) of a polymer other than the poly-p-phenylene sulfide is added.

Examples of such polymers added include polyethylene, polypropylene, ethylene/propylene copolymers, polystyrene, polysulfone, polyether sulfone, tetrafluoroethylene/hexafluoropropylene copolymers, and polyamides.

The resin composition (PPS) obtained in this way is fed to a well-known melt extruder represented by an extruder and molten material therein.

In order that the Sd and Ld of the film surface may fall within the range of the constitution, of this invention, fine particles having an average particle diameter of from 0.1 to 1.5 μm, if desired, are predispersed in the resin composition in any arbitrary stage before the above step of melt extrusion. Although the amount of said fine particles added may vary with the kinds and amounts of the particle components contained in the resin composition and the average particle diameter, etc., of the fine particles added, it is approximately within the range of from 0.05 to 0.8 wt. %.

The molten resin is filtered through a high-efficiency filter having a 95%-cut pore diameter of from 3 to 20 μm (preferably from 3 to 15 μm) and continuously extruded through a T die, and rapidly solidified by casting on a cooled metal drum to form an unoriented amorphous sheet. It is preferable that the surface of said metal drum is mirror-finished to a roughness of 0.4 S or below.

The sheet thus obtained is biaxially stretched. Although methods for stretching may be well-known ones such as successive or simultaneous biaxial stretching, the so-called successive longitudinal and lateral biaxial stretching method in which a sheet is stretched longitudinally by means of a group of rollers and then it is stretched laterally by means of a tenter is preferable.

The temperature of stretching is in the range of from 95° to 110° C. for both of the longitudinal and lateral stretching. Although, the draw ratio may vary with a resin viscosity, and stretching temperature, etc., and is not specifically limited, it is in the range of from 3.2 to 4.5 for one in the longitudinal stretching and from 3.0 to 3.8 for one in the lateral stretching.

The stretched film obtained in this way is subjected to constant-length heat treatment. By the constant-length heat treatment herein mentioned is meant a heat treatment in which changes in the width and length of a sheet during the heat treatment are controlled within 10%. The conditions of this heat treatment include 250° to 290° C. and 1 to 50 sec., preferably 260° to 285° C. and 3 to 20 sec.

After the constant-length heat treatment, the sheet is relaxed at a temperature of from 240° to 290° C. The relax ratio is controlled so that the longitudinal and lateral heat shrinkages at 250° C. of the metallized PPS-BO may fall within the above-mentioned ranges, and the range of control is from about 4 to 10% for one in the transverse direction and from about 0 to 6% for one in the machine direction.

In this way, a biaxially oriented PPS film is obtained.

When a metal foil is used as the electrode, it is formed into a capacitor element by the so-called winding method in which the film thus obtained is thinly cut and the cut film laid on a similarly thinly cut metal foil and wound to form a cylinder.

When a metal layer is used as the electrode, the thin metal layer as the electrode is formed on the surface of the above-obtained film by vacuum vapor deposition or the like to form the so-called metallized film. Said metallized film is formed into a capacitor element by well-known methods such as winding or stacking. It is preferable that the capacitor element is thereafter heated at a temperature of from 200° to 250° C. and pressed in the direction normal to the axis of winding.

When the thin metal film layer is formed on the film, it is preferable that the surface of the film is previously subjected to surface treatment such as corona discharge treatment or plasma treatment.

Both of the ends of the obtained capacitor element are subjected to electroconductivity-imparting treatment.

In said first embodiment, this electroconductivity-imparting treatment of the end surfaces may be performed in a usual manner by using Metallikon.

Next, an electrode lead member is welded to each of the electroconductivity-imparted parts of the capacitor element subjected to the treatment for imparting electroconductivity to the ends and the periphery of the element is covered with a resin composition for an outer package to obtain the first embodiment capacitor of this invention. It is a matter of course that part of each electrode lead member must be outside the outer package in this capacitor.

For this purpose, it is preferable to weld a thin metal piece of a thickness of from 0.05 to 0.5 mm and a width of from 1 to 5 mm as an electrode lead member to the end at an angle normal to it, put the capacitor element in such a state into the die of a transfer molding machine, mold its periphery with an epoxy resin or the like, cut each electrode lead member to a necessary length and bend the member downwardly along the end surface and then along the lower surface.

It is preferable that the treatment for imparting electroconductivity to the ends in the second embodiment of the capacitor of this invention is performed by using a high-melting Metallikon, a thermosetting electroconductive paste or the like.

Although said electroconductivity-imparted part may be used as such as an electrode lead member, an electrode lead member is provided, if desired, on each electroconductivity-imparted part.

In the second embodiment, the electrode lead member in any case is constructed of a material infusible at 260° C., and it must cover the whole of each end surface and part of the lower surface. Of course, the electrode lead members which cover the end surfaces must be isolated from each other.

In this way, the capacitor of this invention can be obtained.

FIG. 1 shows a first embodiment of the capacitor of this invention, wherein a capacitor element 2 is composed of a dielectric material 3 comprising stacked PPS-BO films and electrodes 4 each comprising a vacuum-deposited thin metal layer interposed between the dielectric materials 3. Then, Metallikon layers 5 and 5' are provided on the ends of the capacitor element and the capacitor element 2 is covered with an outer package 6.

Further, electrode lead members 7 and 7' are welded to the Metallikon layers 5 and 5', and part of each of them protrudes beyond the surface of the outer package.

Figure 2:
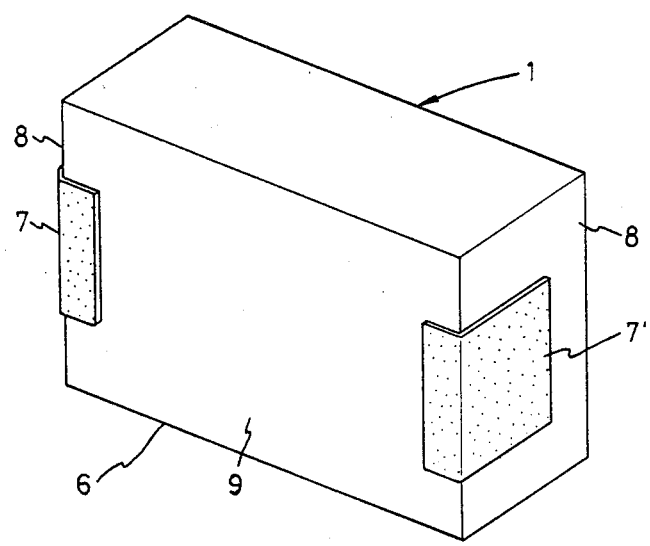
FIG. 2 is an outer perspective view thereof.

The capacitor 1 of this invention has an appearance as shown in FIG. 2, wherein 8 and 8' represent the end surfaces of the capacitor element and 9 represents its lower surface.

Figure 3:
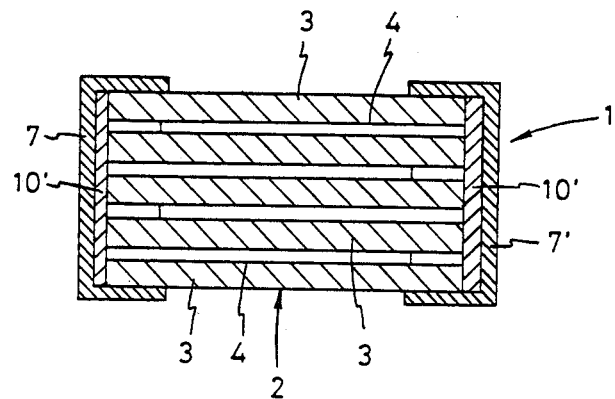
FIG. 3 is a sectional view of a second embodiment of the capacitor of this invention.

FIG. 3 represents a second embodiment of the capacitor 1 of this invention, wherein the capacitor element 2 is constructed of a dielectric material 3 comprising stacked PPS-BO films and electrodes 4 comprising vacuum-deposited thin metal layer interposed between these dielectric material sheets 3. A high-melting Metallikon layer 10 or 10' is provided on each of the end surfaces of this capacitor element 2, and an electrode lead member 7 or 7' is further provided on each of the Metallikon layer.

Figure 4:
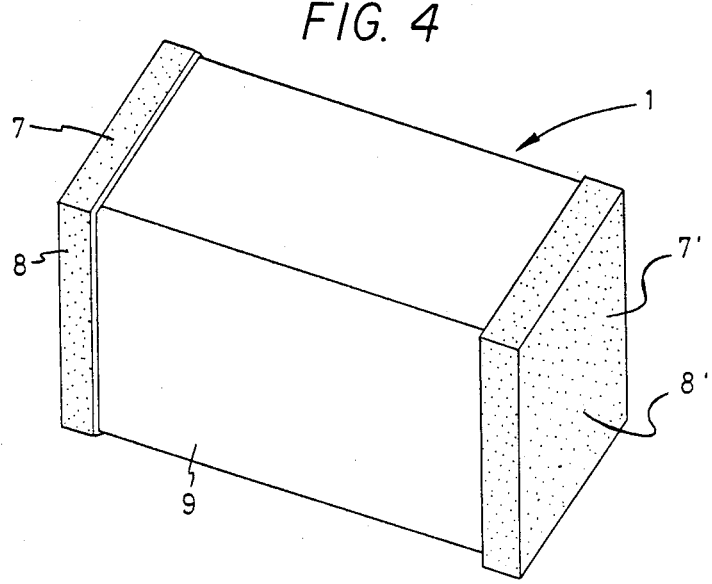
FIG. 4 is an outer perspective view thereof.

The capacitor of this invention has an appearance as shown in FIG. 4, wherein 8 and 8' represent the end surfaces of the capacitor element 2 and 9 represents its lower surface.

As a result of having the structure such as above, the capacitor of this invention could be freed from dispersions of capacitance and breakdown voltage, which were the defects of a conventional capacitor having a polyphenylene sulfide film as the dielectric material, and could be one excellent in the stability and uniformity of capacitance and breakdown voltage.

As a result of having the structure such as the above, the capacitor of this invention has features, which could not be realized by any conventional film capacitor, that when this capacitor as a chip capacitor is mounted on a circuit board by a surface mounting method, the mounting can be performed without any limitation by using a usual soldering apparatus and usual conditions, irrespective of whether it is performed by a reflow process or a dip process and, besides, the capacitor undergoes extremely low changes in capacitance, lowering in insulation resistance and withstand voltage, etc., during soldering.

In addition, the capacitor of this invention has an excellent feature that its capacitance scarcely changes even when the temperature and humidity change markedly, which no conventional capacitor could show, so that it is suitable for use in a circuit which must have a capacitance always constant under varying environments.

Further, the capacitor of this invention suffers only a small dielectric loss over a wide range of temperature and shows stable characteristics for a long time at a temperature as high as 100° to 170° C., so that it is suitable for use in a place with a high ambient temperature, such as the insides of an automobile or an electric device or appliance.

Besides, because the capacitor in the second embodiment of this invention has no outer package, the outer size for obtaining a desired capacitance can be reduced as compared with that having an outer package, so that it has an outstanding feature that the mounting density in the former can be enhanced correspondingly. Further, the manufacturing process can be simplified because no outer package is provided.

Description will now be made about methods for measuring and evaluating the characteristic values of films and capacitors used in the description of this invention.

(1) heat shrinkage of film:

The heat shrinkage (%) is defined by the equation:

$$100 \times (A-B)/A$$

wherein A is the initial length of a film, and B is the length of this film after heating at 250° C. for 10 min in a hot-air oven.

(2) capacitance of a capacitor:

The capacitance was measured at 25° C. and 1 kHz by using an automatic capacitance bridge.

(3) dispersion of capacitance:

The dispersion of capacitance is defined by the equation:

$(\sigma_c/\bar{C}) \times 100$ (%) wherein $\bar{C}$ is an average value, $\sigma_c$ is a standard deviation, and these are determined from the data obtained by measuring the capacitances of 100 capacitors all of which are manufactured under the same conditions. Needless to say, the smaller this dispersion, the more excellent the capacitors.

(4) insulation resistance:

This value was determined from an electric current which flowed when a 50 V DC was applied between the electrodes.

(5) breakdown voltage of a capacitor:

The breakdown voltage is defined as a voltage at which a capacitor is broken down when the capacitor is allowed to stand for 24 hr in an atmosphere of 23° C. and 50% RH and then the applied DC voltage is increasing at a rate of increase of 100 V/sec in the same atmosphere.

(6) dispersion of breakdown voltage:

This dispersion is defined by the equation:

$(\sigma_v/\bar{V}) \times 100$ (%)

wherein $\bar{V}$ is an average value, $\sigma_v$ is a standard deviation, and these are determined from the data obtained by measuring the breakdown voltages of 100 capacitors all of which are manufactured under the same conditions. Needless to say, the smaller this dispersion, the more excellent the capacitors.

(7) soldering-heat resistance test:

The soldering-heat resistance was evaluated by the rate of changes in a characteristic value between the initial value of a sample and its value after 10 sec immersion in a 250° C. soldering bath. Needless to say, the smaller this change, the more excellent the soldering-heat resistance.

EXAMPLE 1

(1) preparation of a biaxially oriented polyphenylene sulfide film (PPS-BO) used in this invention:

An autoclave was charged with 32.6 kg (250 mol, containing 40 wt. % of water of crystallization) of sodium sulfide, 100 g of sodium hydroxide, 36.1 kg (250 mol) of sodium benzoate, and 79.2 kg of N-methyl-2-pyrrolidone (hereinafter abbreviated as NMP). The reaction mixture was dehydrated at 205° C. and 37.5 kg (255 mol) of 1,4-dichlorobenzene (abbreviated as p-DCB) and 20.0 kg of NMP were added thereto. The resulting mixture was allowed to react as 260° C. for 3.5 hr. The reaction product was washed with water and dried to obtain 21.1 kg (yield of 78%) of poly-p-phenylene sulfide comprising 100 mol % p-phenylene sulfide units and having a melt viscosity of 2500 poise.

To this composition, 0.1 wt. % of a fine silica powder of an average particle diameter of 0.7 μm and 0.05 wt. % of calcium stearate were added, and the resulting mixture was molten at 310° C. in an 40 mmφ extruder, filtered through a filter composed of a metallic fiber and having a 95%-cut-off pore of 10 μm, extruded from a T die with a linear lip of a length of 400 mm and a slit of 1.5 mm, and cooled and solidified by casting on a metal drum with its surface kept at 25° C. to obtain an unoriented film of a thickness of 52 μm.

This film was stretched lengthwise at a draw ratio of 4.4 and a drawing speed of 30000%/min and a film temperature of 98° C. by means of a longitudinal stretching apparatus composed of a group of rollers, then stretched crosswise at a temperature of 100° C. and a drawing speed of 1000%/min and a draw ratio of 3.8 by means of a tenter and then heat-treated at 275° C. for 10 sec in the succeeding treatment chamber within this tenter to obtain PPS-BO having a thickness of 4 μm (hereinafter referred to as film A).

This film had an Sd of 67/mm, an Ld of 1/mm and a density of 1.360, and met the requirements for the PPS-BO used in this invention.

Separately, for comparison, a biaxially oriented PPS film (referred to as film B) was prepared by using quite the same conditions as for film A except that no fine silica powder was added before melt extrusion. This film had an Sd of 11/mm, an Ld of 1/mm, and a density of 1.361 g/m³, and did not meet the requirements for the PPS-BO used in this invention.

(2) fabrication of a capacitor:

The above films A and B were each set on a vacuum vapor deposition apparatus and one surface of each film was metallized with aluminum so that the surface resistance might be 3Ω. Each of these metallized films were slitted and wound in two plies by a winder. The hollow portion of the formed winding was collapsed by pressing at 120° C. to form a capacitor element. The obtained element was further subjected as such to end Metallikon treatment and lead wire bonding to obtain a capacitor (capacitance of 0.05 μF) (hereinafter referred to as capacitor A and capacitor B, respectively).

(3) evaluation:

Table 1 shows the results of evaluation of the capacitors. This table shows that the capacitor of this invention (capacitor A) is excellent one having only small dispersions of capacitance and breakdown voltage.

TABLE 1

| items | classification | |
|---|---|---|
| | capacitor A | capacitor B |
| PPS-BO | | |
| Sd (number/mm) | 67 | 11 |
| Ld (number/mm) | 1 | 1 |
| density (g/m³) | 1.360 | 1.361 |
| planer orientation factor | 0.86 | 0.85 |
| average surface roughness Ra (μm) | 0.031 | 0.015 |
| capacitor | | |
| average of capacitance (μF) | 0.52 | 0.47 |
| dispersion of capacitance (%) | 4.8 | 10.1 |
| average of breakdown voltage (V) | 1120 | 1080 |
| dispersion of breakdown voltage (%) | 4.2 | 9.7 |
| notes | this invention | comparative |

EXAMPLE 2

(1) preparation of PPS-BO:

Five kinds of PPS-BO (thickness of 6 μm) (referred to as films C to G) were prepared in the same manner as for film A in Example 1 except that the average particle diameter and amount of a fine silica powder added before melt extrusion was varied.

(2) fabrication and evaluation of capacitors:

Separately wound capacitors were fabricated in the same manner as in Example 1 by using films C to G as dielectric materials and using vacuum-deposited aluminum layers as electrodes.

Table 2 shows the results of evaluation of the obtained capacitors. This table shows that the invention capacitor having a small-protrusion density Sd and a large-protrusion density Ld within the specified ranges undergoes extremely small dispersion of capacitance and breakdown voltage and is excellent.

EXAMPLE 3

PPS-BO of a thickness of 2.5 μm (referred to as film H) was obtained in the same manner as in Example 1 by adding 0.5% of fine calcium carbonate powder of an average particle diameter of 2 μm before melt extrusion and filtering the melt through a filter composed of a metallic fiber having a 95%-cut-pore diameter of 10 μm.

For comparison, a biaxially oriented film having a thickness of 2.5 μm (referred to as film I) was prepared in the same manner as the above except that the melt was filtered through a filter having a 95%-cut-pore diameter of 40 μm.

Next, separately wound capacitors (referred to as capacitors H and I) were fabricated in the same manner as in Example 1 by using films H and I as the dielectric materials and using vacuum-deposited aluminum layers as the electrodes.

Table 3 shows the characteristic values of the films used and the results of evaluation of the obtained capacitors.

This table shows that when the large-protrusion density is excessively high, the object of this invention can not be attained.

TABLE 2

| classification: | capacitor | | | | |
|---|---|---|---|---|---|
| | C | D | E | F | G |
| item | | | | | |
| PPS-BO | | | | | |
| Sd (number/mm) | 42 | 156 | 263 | 391 | 108 |
| Ld (number/mm) | 1 | 2 | 4 | 4 | 7 |
| density (g/cm³) | 1.361 | 1.360 | 1.361 | 1.359 | 1.363 |
| orientation factor | 0.86 | 0.85 | 0.83 | 0.86 | 0.84 |
| average surface roughness Ra (μm) | 0.029 | 0.044 | 0.069 | 0.065 | 0.052 |
| Capacitor | | | | | |
| average of capacitance (μF) | 0.51 | 0.53 | 0.48 | 0.46 | 0.48 |
| dispersion of capacitance (%) | 4.4 | 3.9 | 3.8 | 7.2 | 6.1 |
| average of breakdown voltage (V) | 1430 | 1440 | 1390 | 1380 | 1270 |
| dispersion of breakdown voltage (%) | 3.2 | 4.4 | 5.1 | 7.7 | 14.3 |
| Notes | invention | invention | invention | comparative | comparative |

TABLE 3

| items | classification | |
|---|---|---|
| | capacitor H | capacitor I |
| PPS-BO | | |
| Sd (number/mm) | 55 | 46 |
| Ld (number/mm) | 3 | 11 |
| density (g/cm³) | 1.362 | 1.361 |
| planer orientation factor | 0.87 | 0.85 |
| average surface roughness Ra (μm) | 0.039 | 0.042 |
| capacitor | | |
| average of capacitance (μF) | 0.49 | 0.46 |
| dispersion of capacitance (%) | 5.3 | 5.5 |
| average of breakdown voltage (V) | 1060 | 820 |
| dispersion of breakdown voltage (%) | 4.5 | 1.27 |
| notes | this invention | comparative |

EXAMPLE 4

(1) preparation of PPS-BO:

To the poly-p-phenylene sulfide of a melt viscosity of 2500 P obtained in Example 1, 0.3 wt. % fine calcium carbonate powder of an average particle diameter of 2.0 μm and 0.05 wt. % of calcium stearate were added, and the mixture was molten at 310° C. in a 40 mmφ extruder, filtered through a filter of a 95%-cut pore diameter of 10 μm, extruded from a T die with a linear lip of a length of 400 mm and a slit of 1.5 mm and cooled and solidified by casting on a metal drum with its surface kept at 25° C. to obtain an unoriented film having a thickness of 31 μm.

This film was stretched lengthwise at a draw ratio of 3.5, a film temperature of 100° C. and a drawing speed of 20000%/min by means of a longitudinal stretching apparatus comprising a group of rollers, then stretched crosswise at a draw ratio of 3.4, a temperature of 100° C. and a drawing speed of 1500%/min by means of a tenter, and subjected to constant-length heat treatment for 5 sec at 275° C. in the succeeding heat treatment chamber within the same tenter to obtain PPS-BO of a thickness of 2.5 μm (hereinafter referred to as film J).

(2) fabrication of a capacitor

Film J was set in a vacuum vapor deposition apparatus and one of its surfaces was metallized with zinc so that the surface resistance might be 2.5Ω. The vapor deposition was performed so that a stripe pattern containing metallized parts of a width of 8.0 mm and non-metallized parts of a width of 1.0 mm by a tape margin method. This metallized film was slitted with a knife along the middle of each of the metallized and non-metallized parts to obtain a pair of two kinds of slit films each having a width of 4.5 mm and a 0.5 mm-wide margin on its right or left. These slit films were set on an element winder and the pair of two kinds of films were wound in two plies in the same direction and preheated for 10 min at 200° C. in an oven. The hollow portion of the winding was collapsed by pressing and the both end surfaces were subjected in a usual manner to Metallikon treatment.

Next, a tin-plated copper plate having a thickness of 0.2 mm, a width of 3 mm and a length of 20 mm as an electrode lead member was welded to each of the end surfaces of this element so that its lengthwise direction might be normal to the end surface, and then this element was set on a transfer molding machine to form an outer package of an epoxy resin having the minimum thickness of 0.6 mm and the maximum thickness of 1.2 mm (1 mm on the average) around the periphery of the element. The resin used was Acmelite 9900F (with a heat distortion temperature of 250° C.), a product of Nippon Gosei Chemical Industry Co., Ltd.

After the molding, each of the electrode lead members protruding beyond the end surfaces of the outer package was cut at a point of a 5 mm length and bent downwardly along each end and further along the lower surface to obtain a capacitor (capacitance of about 0.05 μF) of this invention (hereinafter referred to as capacitor J1). The same element as that of this capacitor before the Metallikon treatment was rewound and the heat shrinkage at 250° C. for 10 min of the metallized film was examined, with the results of 2.3% for one in the machine direction and 3.5% for one in the transverse direction.

(3) evaluation:

Table 4 shows the results of evaluation of the obtained capacitors. This table shows that the capacitors of this invention are chip capacitors extremely small in the temperature coefficient of capacitance and excellent also in soldering resistance.

COMPARATIVE EXAMPLE 1

A capacitor (referred to as capacitor J2) was fabricated in the same manner as in Example 4 except that film J was used as the dielectric material and no outer package was provided.

Table 4 shows the results of evaluation.

EXAMPLE 5

(1) preparation of PPS-BO:

Four kinds of PPS-BO (of a thickness of 4 μm) (referred to as films K to N) were prepared in the same manner as in Example 4 except that the draw ratios and the temperatures in constant-length heat treatment were varied.

(2) fabrication and evaluation of capacitors:

Four kinds of chip capacitors with an outer package each of which had a film K to N as a dielectric material (hereinafter referred to as capacitors K to N) were fabricated in the same manner as in Example 4 except that only the press preheating temperature was varied as shown in Table 4.

Table 4 shows the results of evaluation of the capacitors. This table shows that all of the capacitors of this invention can show both excellent characteristics represented by temperature characteristics of capacitance and excellent soldering-heat resistance.

TABLE 4

| | | | Example 4 | Comp. Ex. 1 | Examples | | | |
|---|---|---|---|---|---|---|---|---|
| capacitor | | | capacitor J1 | capacitor J2 | capacitor K | capacitor L | capacitor M | capacitor N |
| dielectric material (times) | | | film A | film A | film B | film C | film D | film E |
| draw ratio (longitudinal × lateral) | | | 3.6 × 3.4 | 3.6 × 3.4 | 3.5 × 3.3 | 3.6 × 3.3 | 3.55 × 3.4 | 3.6 × 3.4 |
| heat treatment temperature (°C.) | | | 275 | 275 | 275 | 275 | 272 | 240 |
| press preheating temperature (°C.) | | | 200 | 200 | 240 | 200 | 130 | 130 |
| outer package | | | has | no | has | has | has | has |
| heat shrinkage (%) of metallized film 250° C., 10 min (longitudinal × lateral) | | | 3.7/3.5 | 3.7/3.5 | 1.5/1.3 | 3.5/3.4 | 5.1/4.5 | 22/23 |
| results of evaluation | capacitance 23° C., 1 kHz | initial value (μF) | 0.0498 | 0.0507 | 0.202 | 0.199 | 0.203 | 0.201 |
| | | change (%) due to soldering-heat resistance test | −0.88 | −4.6 | −0.43 | −0.90 | −2.3 | −6.52 |
| | temperature coefficient of capacitance 0-80° C., 1 kHz | initial value (ppm/°C.) | 63 | 63 | 57 | 64 | 66 | 72 |
| | | value after soldering-heat resistance test (ppm/°C.) | 61 | 64 | 56 | 62 | 62 | 64 |
| | tan δ 23° C., 1 kHz | initial value | 0.00055 | 0.00051 | 0.00049 | 0.00048 | 0.00051 | 0.00052 |
| | | value (%) after soldering-heat resistance test | 0.00054 | 0.00051 | 0.00048 | 0.00049 | 0.00049 | 0.00052 |
| | insulation re- | initial value (Ω) | $1 \times 10^{12}$ | $1 \times 10^{12}$ | $2 \times 10^{12}$ | $1 \times 10^{12}$ | $1 \times 10^{12}$ | $1 \times 10^{12}$ |

TABLE 4-continued

|  |  | Example 4 | Comp. Ex. 1 | Examples | | | |
|---|---|---|---|---|---|---|---|
| sistance 50 V | value after soldering-heat resistance test (Ω) | $1 \times 10^{12}$ | $3 \times 10^{11}$ | $2 \times 10^{12}$ | $1 \times 10^{12}$ | $1 \times 10^{12}$ | $2 \times 10^{12}$ |
| notes |  | invention | comp. | invention | invention | invention | comp. |

EXAMPLE 6

(1) preparation of PPS-BO:

In the same manner as in Example 4, an unstretched film was oriented, subjected to constant-length heat treatment at 275° C. for 5 sec and relaxed for 5 sec at a temperature lower than that of the heat treatment by 10° C. in the relaxation chamber succeeding to the heat treatment chamber within the same tenter to reduce its tenter rail width by 7% to obtain PPS-BO of a thickness of 2.5 μm (hereinbelow referred to as film O).

(2) fabrication of capacitors:

Film A was set in a vacuum vapor deposition apparatus and one of its surfaces was metallized with zinc so that the surface resistance might be 2.5Ω. The metallization was performed so that a stripe pattern containing metallized parts of a width of 8.0 mm and non-metallized parts of a width of 1.0 mm by a tape margin method. This metallized film was slitted with a knife along the middle of each of the metallized and non-metallized parts to obtain a pair of two kinds of slit films each having a width of 4.5 mm and a 0.5. mm-wide margin on its right or left. These slit films were set on an element winder and the pair of two kinds of films were wound in two plies in the same direction and preheated for 10 min at 200° C. in an oven. The hollow portion of the winding was collapsed by pressing and the both end surfaces were subjected in a usual manner to Metallikon treatment. Further, the Metallikon on each of the end surfaces of this element was covered with a metal cap comprising nickel-plated copper as an electrode lead member to obtain a capacitor of this invention (with a capacitance of 0.5 μF) (hereinafter referred to as capacitor O). The element as that of this capacitor before the Metallikon treatment was rewound and the shrinkage at 250° C. for 10 min was examined, with the results of 1.9% for one in the machine direction and 0.2% for one in the transverse direction.

(3) evaluation:

Table 5 shows the results of evaluation of the capacitor obtained. This table shows that the capacitor of this invention is extremely low in changes in capacitance due to soldering heat and excellent in soldering resistance, though it has no outer package and extremely small in size.

TABLE 5

|  | initial value | value after soldering heat resistance test | % change due to soldering heat resistance test |
|---|---|---|---|
| capacitance 23° C., 1 kHz | 0.1521 μF | 0.1506 μF | −0.99% |
| tan δ 23° C., 1 kHz | 0.00051 | 0.00050 | −2.0% |
| insulation resistance 50 V | $1 \times 10^{12}$ Ω | $1 \times 10^{12}$ Ω | 0% |

(Ten samples were measured, and an arithmetic mean of the measured values was taken)

EXAMPLE 7

(1) preparation of PPS-BO:

Four kinds of PPS-BO (thickness of 4 μm) were prepared in the same manner as for film O in Example 6, except that the draw ratios, the constant-length heat treatment temperatures and the % relaxation were varied. These films are referred to as films P to S.

(2) fabrication and evaluation of capacitors:

Four kinds of non-packaged chip capacitors in which films P to S were used as the dielectric materials (hereinafter referred to as capacitors P to S) were fabricated in the same manner as in Example 6 except that only the press preheating temperature was varied as shown in Table 6.

Table 6 shows the results of evaluation of the fabricated capacitors.

This table shows that those capacitors in which the heat shrinkages of the metallized films constituting the capacitors can fall within the range as set forth in this invention can have good soldering-heat resistance as nonpackaged chip capacitors.

TABLE 6

| capacitor | | | capacitor P | capacitor Q | capacitor R | capacitor S |
|---|---|---|---|---|---|---|
| dielectric material | | | film B | film C | film D | film E |
| draw ratio (times)(longitudinal × lateral) | | | 3.5 × 3.3 | 3.6 × 3.3 | 3.55 × 3.4 | 3.6 × 3.4 |
| heat treatment temperature (°C.) | | | 275 | 275 | 272 | 240 |
| lateral relaxation (%) | | | 7.0 | 6.5 | 7.0 | 2.0 |
| press preheating temperature (°C.) | | | 240 | 200 | 130 | 130 |
| heat shrinkage (%) of metallized film 250° C., 10 min (longitudinal × lateral) | | | 1.5/−0.1 | 3.6/0.1 | 5.2/−0.2 | 22/18 |
| results of evalua- tion | capaci- tance 23° C., 1 kHz | initial value | 0.0483 | 0.0492 | 0.0501 | 0.0488 |
| | | change (%) due to soldering-heat resistance test | −0.76 | −1.55 | −2.11 | −6.33 |
| | tan δ (23° C., 1 kHz) | initial value | 0.00048 | 0.00056 | 0.00046 | 0.00057 |
| | | change (%) due to soldering-heat resistance test | +1.4 | 0.0 | +0.4 | +0.3 |
| | insula- | initial value | $2 \times 10^{12}$ | $1 \times 10^{12}$ | $1 \times 10^{12}$ | $2 \times 10^{12}$ |

TABLE 6-continued

| | | | | | |
|---|---|---|---|---|---|
| | tion resistance 50 V | (Ω) change (%) due to soldering-heat resistance test | 0 | 0 | 0 | $6 \times 10^{11}$ |
| notes | | | invention | invention | invention | Comp. |

We claim:

1. A capacitor having a plurality of electrodes in the form of thin layers or foils of a metal and a plurality of layers of dielectric material, at least one layer being disposed between each electrode, said dielectric material comprising a biaxially oriented film of a resin composition containing at least 90 weight percent of poly-p-phenylene sulfide, having a heat shrinkage at 250° C. for 10 minutes between 0 and 8% in the machine direction of the film and between −2 and 6% in the transverse direction of the film, a small protrusion density Sd between 20 and 300/mm and a large protrusion density Ld of less than or equal to 5/mm.

2. A capacitor according to claim 1, wherein the capacitor has an outer package comprising a thermosetting resin having a heat distortion temperature of at least 230° C. and an electrode lead member infusible at 260° C. disposed on each of the end surfaces of the capacitor element.

3. A capacitor according to claim 2, wherein the electrode lead members comprise a thin metal piece and each thin metal piece covers part of one end surface of the capacitor and part of the lower surface of the capacitor.

4. A capacitor according to claim 2 or 3, wherein the outer package comprises one formed by transfer-molding an epoxy resin.

5. A capacitor according to claim 1, 3, or 4, wherein each of the electrodes comprises a thin metal layer vacuum-deposited on the surface of a dielectric film.

6. A capacitor according to claim 5, wherein the heat shrinkage at 250° C. for 10 min of the dielectric film on which the thin metal film is vacuum-deposited is from 0 to 8% for one in the machine direction of the film and from −2 to 6% for one in the transverse direction of the film.

7. A capacitor according to claim 1, wherein the electrodes are each a thin metal layer vacuum-deposited on the surface of a dielectric film, an electrode lead member infusible at 260° C. is disposed on each of the end surfaces of the capacitor element, the heat shrinkage at 250° C. for 10 min of said vacuum-deposited film is from 0 to 6% for one in the machine direction of the film and from −2 to 2% for one in the transverse direction of the film, said capacitor has no outer package, and each of said electrode lead members covers the entire surface of each end surface and part of the lower surface of the capacitor.

* * * * *